(12) United States Patent
Kim et al.

(10) Patent No.: US 11,850,911 B2
(45) Date of Patent: Dec. 26, 2023

(54) MOUNTING STRUCTURE OF THERMAL MANAGEMENT MODULE FOR VEHICLE

(71) Applicants: HYUNDAI MOTOR COMPANY, Seoul (KR); Kia Corporation, Seoul (KR); HANON SYSTEMS, Daejeon (KR)

(72) Inventors: Yeonho Kim, Seoul (KR); Gee Young Shin, Suwon-si (KR); Jae Yeon Kim, Hwaseong-si (KR); Jeawan Kim, Hwaseong-si (KR); Jung Sam Gu, Daejeon (KR); Jae Chun Ryu, Daejeon (KR); Sung-Wook Park, Daejeon (KR)

(73) Assignees: HYUNDAI MOTOR COMPANY, Seoul (KR); KIA CORPORATION, Seoul (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 17/725,859

(22) Filed: Apr. 21, 2022

(65) Prior Publication Data
US 2023/0072182 A1  Mar. 9, 2023

(30) Foreign Application Priority Data

Sep. 3, 2021 (KR) .......................... 10-2021-0117444

(51) Int. Cl.
*B60H 1/00* (2006.01)
*B60H 1/32* (2006.01)

(52) U.S. Cl.
CPC ..... *B60H 1/00535* (2013.01); *B60H 1/32331* (2019.05)

(58) Field of Classification Search
CPC ............ B60H 1/00535; B60H 1/32331; B60H 1/00021; B60H 1/00457
See application file for complete search history.

(56) References Cited

U.S. PATENT DOCUMENTS

| | | | | |
|---|---|---|---|---|
| 3,170,509 A | * | 2/1965 | De Rees | B60H 1/0005 237/28 |
| 3,289,564 A | * | 12/1966 | De Castelet | B60H 1/3414 454/127 |
| 3,715,001 A | * | 2/1973 | Wilson | B62D 49/005 180/68.4 |
| 4,726,326 A | * | 2/1988 | Charles | B60K 11/08 123/41.58 |
| 2020/0018552 A1 | * | 1/2020 | Kimmel | F28F 21/06 |
| 2021/0215088 A1 | * | 7/2021 | Tanaka | F01P 3/18 |

* cited by examiner

*Primary Examiner* — David J Teitelbaum
(74) *Attorney, Agent, or Firm* — MORGAN, LEWIS & BOCKIUS LLP

(57) ABSTRACT

A mounting structure of a thermal management module for a vehicle, includes: a mounting carrier mounted at a front of a vehicle body and having a receiving space; and a thermal management module mounted in the receiving space; wherein the thermal management module includes: an air conditioner mounted in the receiving space and configured to adjust a temperature of a vehicle interior according to a cooling mode or a heating mode; and a cooling device mounted in the receiving space and configured to heat-exchange with a working fluid using an external air introduced from outside of the cooling device.

9 Claims, 8 Drawing Sheets

MOUNTING STRUCTURE OF THERMAL MANAGEMENT MODULE FOR VEHICLE

CROSS-REFERENCE TO RELATED APPLICATION

The present application claims priority to Korean Patent Application No. 10-2021-0117444 filed on Sep. 3, 2021, the entire contents of which is incorporated herein for all purposes by this reference.

BACKGROUND OF THE PRESENT DISCLOSURE

Field of the Present Disclosure

The present disclosure relates to a mounting structure of a thermal management module for a vehicle. More particularly, the present disclosure relates to a mounting structure of a thermal management module for a vehicle for stably mounting a thermal management module while minimizing a mounting space in front of a vehicle body in a Purpose Built Vehicle (PBV).

Description of Related Art

Recently, the vehicle industry has introduced a new concept of future mobility visions for realizing a human-centered dynamic future city.

One of these future mobility solutions is a PBV for purpose-based mobility.

The PBV is an environment-friendly mobility solution that provides customized services necessary for occupants during the time of moving to the destination on the ground, and it may also perform setting of an optimal path and cluster driving for each situation using electric vehicle-based and artificial intelligence.

In other words, the PBV vehicle is a means of transportation and a fixed facility in which case-related technologies are concentrated, and has an autonomous driving function so that a separate driver's seat is unnecessary. Furthermore, the indoor space has substantial expandability.

This PBV vehicle may be changed not only to a role of a shuttle that moves a plurality of people, but also to recreational spaces such as restaurants, cafes, hotels, and movie theaters, and socially essential facilities such as hospitals and pharmacies.

Here, the PBV vehicle is moved using an electric motor for power, and includes a skateboard-type rolling chassis (also called an underbody or a skateboard in the industry) in which a battery is widely spread on the lower portion, and an upper vehicle body which may accommodate an occupant.

The PBV vehicle configured in the instant way is provided with an air conditioner for controlling the indoor temperature of the upper vehicle body, and a thermal management module that supplies a coolant or a refrigerant to the air conditioner, however, there is a problem that it is difficult to dispose each constituent element of the thermal management module in a narrow mounting space, and the layout of pipes through which the coolant or the refrigerant flows is complicated.

Furthermore, due to the limitation of the mounting space of the rolling chassis, the constituent elements of the thermal management module or the constituent elements of the air conditioner may be mounted on the upper vehicle body, and there is also a problem in that the internal space of the upper vehicle body is reduced.

To solve these problems, there is a need to develop a technology for mounting the thermal management module and the air conditioner on the rolling chassis.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a mounting structure of a thermal management module for a vehicle stably mounting the thermal management module while minimizing the mounting space in front of the vehicle body in the Purpose Built Vehicle (PBV).

A mounting structure of a thermal management module for a vehicle according to various exemplary embodiments of the present disclosure includes: a mounting carrier mounted at a front of a vehicle body and having a receiving space; and a thermal management module mounted in the receiving space; wherein the thermal management module includes: an air conditioner mounted in the receiving space and configured to adjust a temperature of a vehicle interior according to a cooling mode or a heating mode; and a cooling device mounted in the receiving space and configured to heat-exchange with a working fluid using an external air introduced from outside of the cooling device.

The mounting carrier may include: a front frame positioned in a front based on a front and rear direction of the vehicle; side frames extending from first and second end portions of the front frame toward a rear of the vehicle body; and a rear frame connected to each of the side frames at a rear of the side frames with respect to the front and rear direction of the vehicle.

The rear frame may be positioned above the front frame based on a height direction of the vehicle.

The front frame, the side frame, and the rear frame may be integrally formed.

In the front frame, the side frames and the rear frame, a plurality of ribs may be formed to crossed vertically, or horizontally, or obliquely based on a top-bottom direction thereof.

The air conditioner may be provided at a top portion of the cooling device in the receiving space.

An air guider may be provided between the air conditioner and the cooling device configured for guiding an external air introduced from the outside thereof to the air conditioner and the cooling device.

An evaporator may be provided inside the air conditioner, and at least one discharge hole may be formed in the air conditioner toward the cooling device at a position corresponding to the evaporator.

At least one penetration hole may be formed in the air guider at a position corresponding to the at least one discharge hole.

The at least one penetration hole may be configured to supply a condensed water of the evaporator discharged from the at least one discharge hole to the cooling device.

The cooling device may be slant provided at a predetermined angle so that a rear of the cooling device is positioned higher than a front of the cooling device based on the height direction of the vehicle.

The cooling device may be mounted at the mounting carrier through a mounting unit.

A cooling fan may be provided behind the cooling device.

As described above, according to the mounting structure of the thermal management module for the vehicle according to various exemplary embodiments of the present disclosure, it is possible to stably mount the thermal management module while minimizing the mounting space in front of the vehicle body in the purpose built vehicle (PBV).

Furthermore, by applying the thermal management module in which the air conditioner and the cooling device are modularized, the layout may be simplified in the narrow vehicle front space, and mountability, assemblability, and maintainability may be improved.

Furthermore, according to an exemplary embodiment of the present disclosure, the cooling efficiency and cooling performance of the cooling device may be improved by supplying the condensed water generated by an evaporator provided inside the air conditioner to the cooling device.

Furthermore, the present disclosure may maximize the internal space of the vehicle which may be applied for various purposes by mounting the thermal management module to the vehicle body in the Purpose Built Vehicle (PBV).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
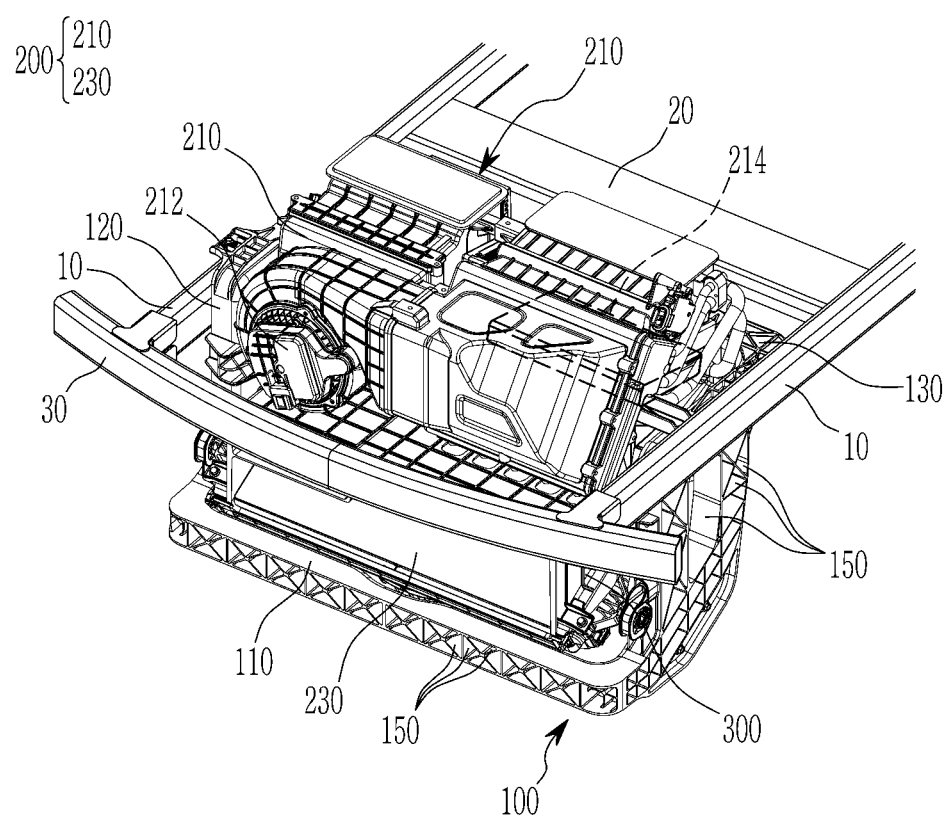
FIG. 1 is a front perspective view of a vehicle body to which a mounting structure of a thermal management module for a vehicle according to various exemplary embodiments of the present disclosure is applied.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Exemplary embodiments described in the exemplary embodiment and a configuration shown in the drawings are just the most preferable embodiment of the present disclosure, but are not limited to the spirit and scope of the present disclosure. Therefore, it should be understood that there may be various equivalents and modifications capable of replacing them at the time of filing of the present application.

To clarify the present disclosure, parts that are not connected with the description will be omitted, and the same elements or equivalents are referred to by the same reference numerals throughout the specification.

The size and thickness of each element are arbitrarily shown in the drawings, and the present disclosure is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member" etc. used herein mean a unit of inclusive components performing at least one or more functions or operations.

Figure 2:
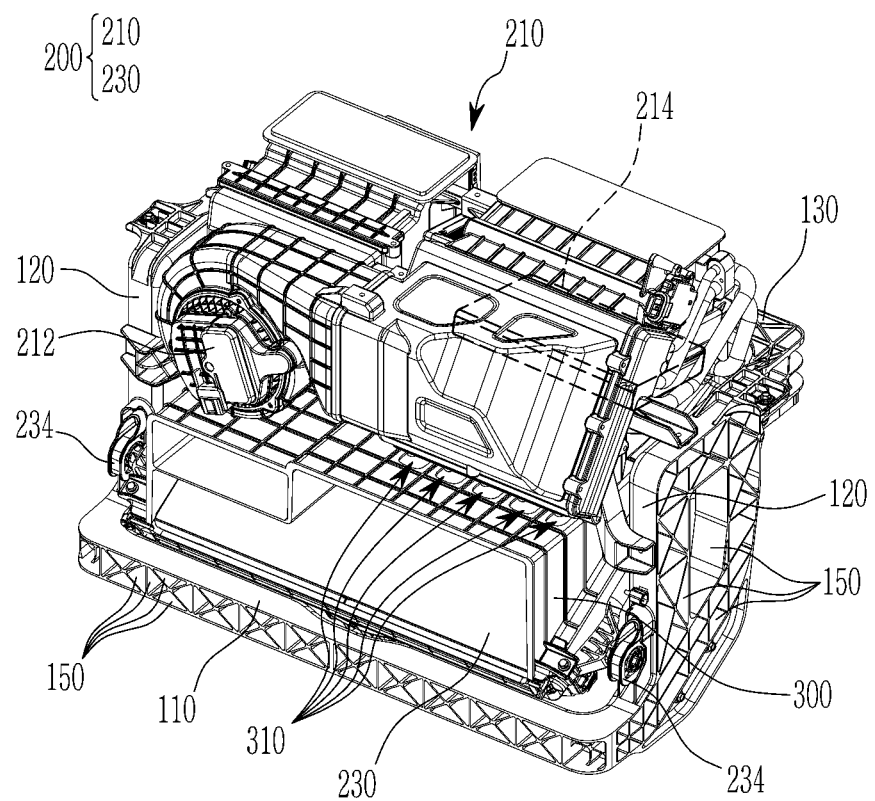
FIG. 2 is a perspective view of a mounting structure of a thermal management module for a vehicle according to various exemplary embodiments of the present disclosure.
Figure 3:
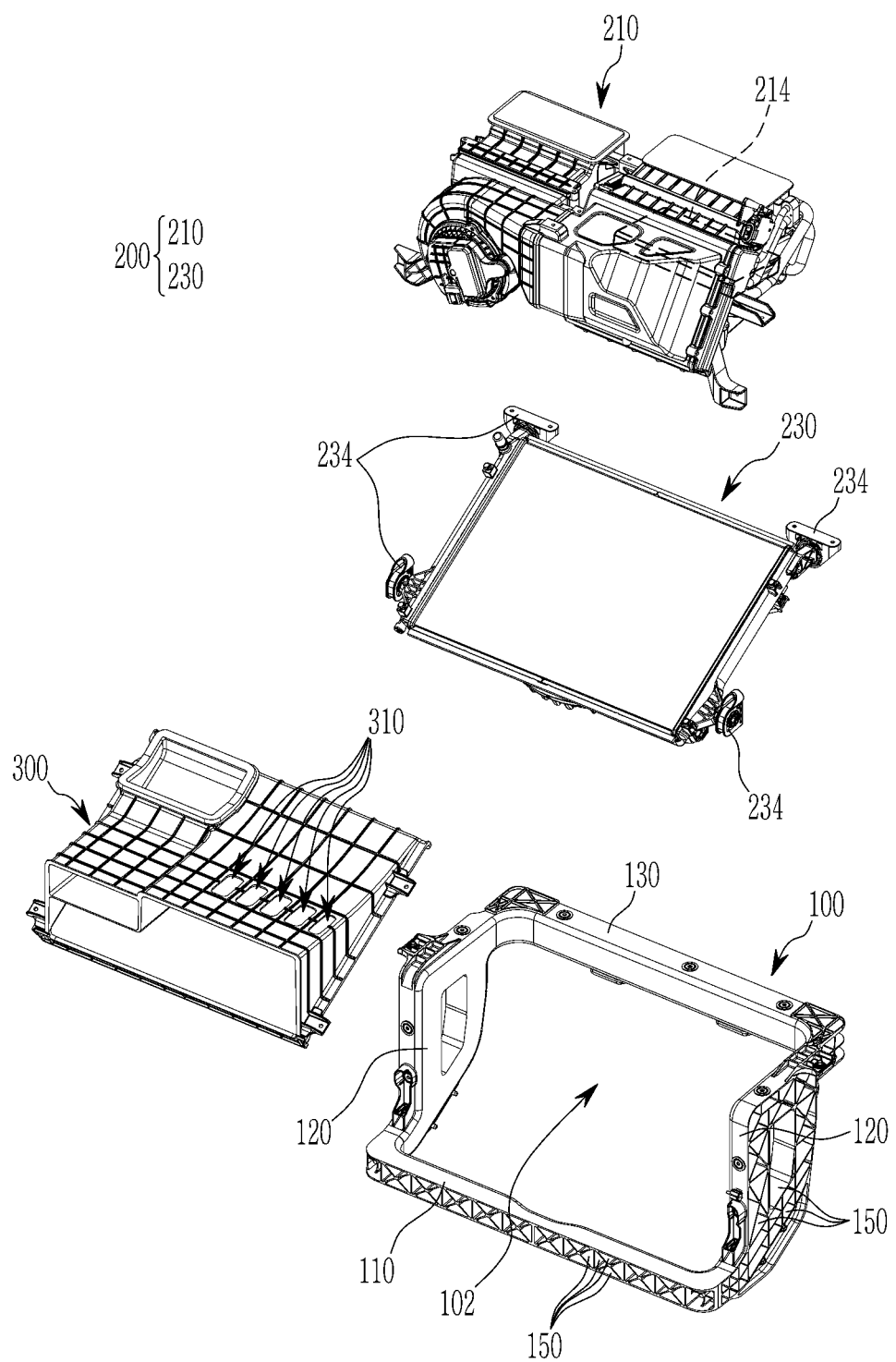
FIG. 3 is an exploded perspective view of a mounting structure of a thermal management module for a vehicle according to various exemplary embodiments of the present disclosure.
Figure 4:
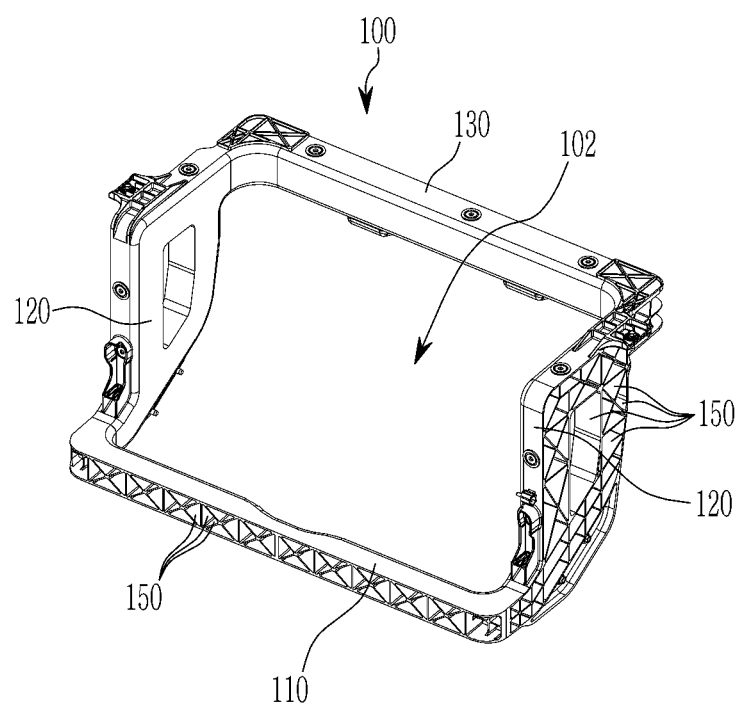
FIG. 4 is a perspective view of a mounting carrier applied to a mounting structure of a thermal management module for a vehicle according to various exemplary embodiments of the present disclosure.
Figure 5:
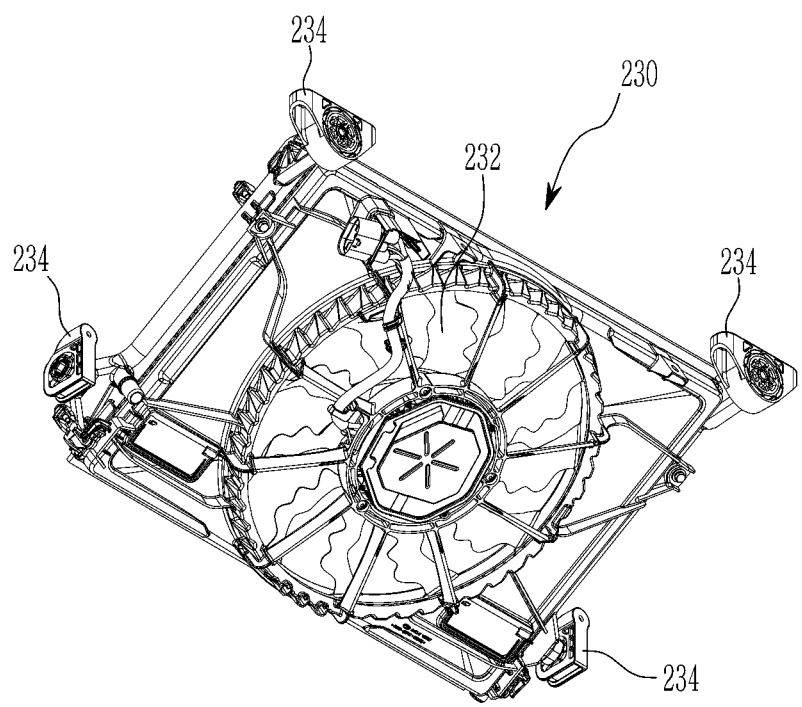
FIG. 5 is a rear perspective view of a cooling device applied to a mounting structure of a thermal management module for a vehicle according to various exemplary embodiments of the present disclosure.
Figure 6:
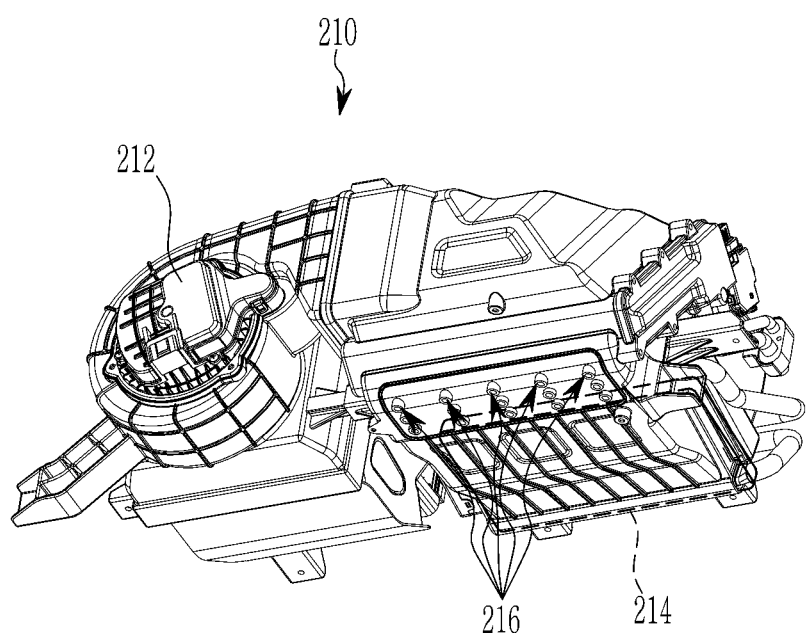
FIG. 6 is a bottom perspective view of an air conditioner applied to a mounting structure of a thermal management module for a vehicle according to various exemplary embodiments of the present disclosure.
Figure 7:
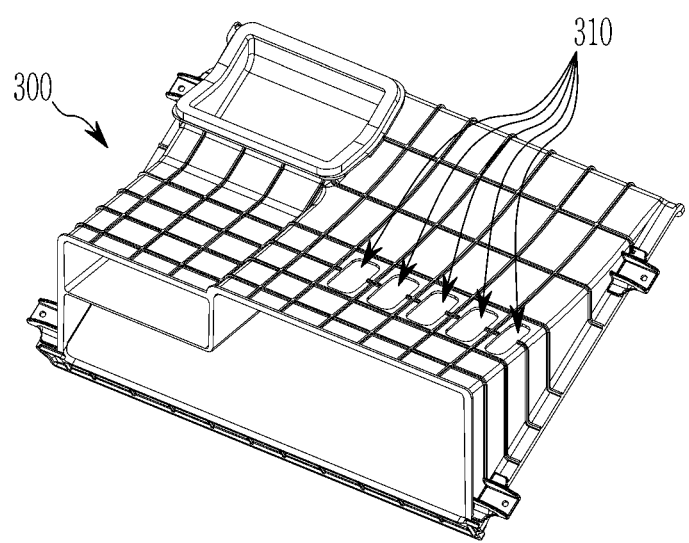
FIG. 7 is a perspective view of an air guider applied to a mounting structure of a thermal management module for a vehicle according to various exemplary embodiments of the present disclosure.
Figure 8:
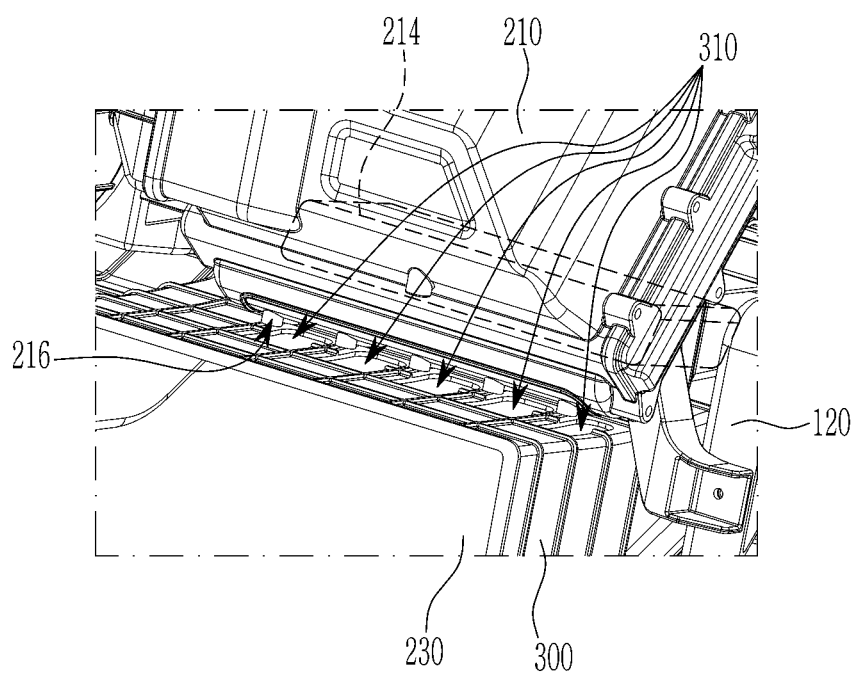
FIG. 8 is a partially enlarged view of illustrating a state in which an air conditioner and an air guider are combined in a mounting structure of a thermal management module for a vehicle according to various exemplary embodiments of the present disclosure.

FIG. 1 is a front perspective view of a vehicle body to which a mounting structure of a thermal management module for a vehicle according to various exemplary embodiments of the present disclosure is applied, FIG. 2 is a perspective view of a mounting structure of a thermal management module for a vehicle according to various exemplary embodiments of the present disclosure, FIG. 3 is an exploded perspective view of a mounting structure of a thermal management module for a vehicle according to various exemplary embodiments of the present disclosure, FIG. 4 is a perspective view of a mounting carrier applied to a mounting structure of a thermal management module for a vehicle according to various exemplary embodiments of the present disclosure, FIG. 5 is a rear perspective view of a cooling device applied to a mounting structure of a thermal management module for a vehicle according to various exemplary embodiments of the present disclosure, FIG. 6 is a bottom perspective view of an air conditioner applied to a mounting structure of a thermal management module for a vehicle according to various exemplary embodiments of the present disclosure, FIG. 7 is a perspective view of an air guider applied to a mounting structure of a thermal management module for a vehicle according to various exemplary embodiments of the present disclosure, and FIG. 8 is a partially enlarged view of illustrating a state in which an air conditioner and an air guider are combined in a mounting structure of a thermal management module for a vehicle according to various exemplary embodiments of the present disclosure.

Various exemplary embodiments of the present disclosure may be applied to, for example, a purpose built vehicle (hereinafter referred to as a PBV).

The PBV is an electric vehicle-based environment-friendly mobile vehicle that provides customized services necessary to an occupant during a travel time to a destination on the ground.

The PBV is configured for setting an optimal path and cluster driving for each situation, and may further be a box-type design vehicle with a large indoor space.

Such a PBV vehicle includes a skateboard type of rolling chassis (also referred to as an under body in the art) and an upper body mounted on the rolling chassis.

The rolling chassis may be provided with a battery assembly, and a drive motor (although not shown in the drawings) may be provided.

Referring to FIG. 1, the mounting structure of the thermal management module for the vehicle according to various exemplary embodiments of the present disclosure is for mounting a thermal management module 200 to the rolling chassis, and includes a mounting carrier 100 and the thermal management module 200.

Herein, the rolling chassis may include a front side member 10, a dash crossmember 20, and a bumper beam 30.

First, the front side member 10 is provided on the left and right sides respectively along the width direction of the vehicle while being formed to extend in the longitudinal direction of the vehicle.

The dash crossmember 20 is formed to extend along the width direction of the vehicle and is coupled to the rear end portion of the front side member 10 on the left and right sides based on the front and rear direction of the vehicle.

The bumper beam 30 is formed to extend in the width direction of the vehicle from the front of the front side member 10 in the longitudinal direction of the vehicle. Accordingly, the front side member 10 may be connected to each other by the bumper beam 30.

That is, the front portions of the front side members 10 on the left and right sides in the longitudinal direction of the vehicle may be connected to each other by the bumper beam 30 formed to extend along the width direction of the vehicle.

The rear portions of the front side member 10 may be connected to each other by the dash crossmember 20 formed to extend along the width direction of the vehicle.

Herein, the front side member 10 may form a space including a substantially rectangular shape by the dash crossmember 20 and the bumper beam 40 coupled to the rear and the front, respectively.

In the exemplary embodiment of the present disclosure, the mounting carrier 100 may be mounted in the space from the front of the vehicle body. A receiving space 102 may be formed in the mounting carrier 100.

As shown in FIG. 2, FIG. 3 and FIG. 4, the mounting carrier 100 may include a front frame 110, a side frame 120, and a rear frame 130.

First, the front frame 110 is located in the front with respect to the front and rear direction of the vehicle.

The side frame 120 extends from both end portions of the front frame 110 toward a rear of the vehicle body based on a width direction of the vehicle.

The rear frame 130 is connected to each of the side frames 120 at a rear with respect to the front and rear direction of the vehicle.

Herein, the rear frame 130 may be positioned above the front frame 110 based on a height direction of the vehicle.

The front frame 110, the side frame 120, and the rear frame 130 configured in the instant way may be integrally formed.

That is, the mounting carrier 100 may be manufactured by a manufacturing method such as extrusion molding so that the front frame 110, the side frame 120, and the rear frame 130 are integrally connected to each other.

Furthermore, in the front frame 110, the side frame 120, and the rear frame 130, a plurality of ribs 150 may be formed to crossed vertically, or horizontally, or obliquely based on a top-bottom direction.

The plurality of ribs 150 are formed around the external periphery of the front frame 110, the side frame 120, and the rear frame 130, reinforcing the overall rigidity of the mounting carrier 100.

Accordingly, the mounting carrier 100 may minimize damage to the thermal management module 200 mounted on the mounting carrier 100 by stably absorbing and dispersing the impact force generated during a front collision of the vehicle.

In the exemplary embodiment of the present disclosure, the thermal management module 200 may be mounted in the receiving space 102.

Herein, the thermal management module 200 may include an air conditioner 210 and a cooling device 230.

First, the air conditioner 210 is mounted in the receiving space 102 formed in the mounting carrier 100. The air conditioner 210 may adjust a temperature of an interior of the vehicle according to a cooling mode or a heating mode.

Herein, the air conditioner 210 may include a blow motor 212 for controlling an amount of air discharged into the interior of the vehicle and an evaporator 214 for evaporating a refrigerant.

Furthermore, a Heating, Ventilation, and Air Conditioning module (HVAC module), a heater core, a positive temperature coefficient heater (PTC heater), an internal condenser, etc. may be further provided inside the air conditioner 210.

The cooling device 230 is mounted in the receiving space 102 formed in the mounting carrier 100. The cooling device 230 may heat-exchange with a working fluid using an external air introduced from outside of the cooling device.

Herein, the cooling device 230 may include a radiator for cooling a coolant, an air-cooling condenser for condensing a refrigerant, and the like. Furthermore, as shown in FIG. 5, a cooling fan 232 may be provided at a rear of the cooling device 230.

That is, the cooling device 230 may heat exchange the coolant or the refrigerant with the external air using a selective operation of the cooling fan 232 and the external air introduced from the outside thereof while the vehicle is driving.

The cooling device 230 may be slant provided at a predetermined angle so that a rear of the cooling device 230 is positioned higher than a front of the cooling device 230 based on the height direction of the vehicle. Accordingly, the cooling device 230 may smoothly heat-exchange between the external air introduced from the outside thereof and the working fluid circulated therein.

The cooling device 230 configured as described above may be mounted on the mounting carrier 100 through a mounting unit 234.

The mounting unit 234 may minimize vibration and impact force transmitted to the cooling device 230 while driving, and may stably mount the cooling device 230 to the mounting carrier 100.

Meanwhile, the air conditioner 210 may be provided at a top portion of the cooling device in the receiving space 102 so that the external air introduced while driving smoothly cools the cooling device 230 and at the same time smoothly flows into the interior of the vehicle.

A plurality of discharge hole 216 may be formed in the air conditioner 210 toward the cooling device 230 at a position corresponding to the evaporator 214.

The discharge holes 216 are formed under the air conditioner 210, and may smoothly discharge a condensed water generated in the evaporator 214 to the outside of the air conditioner 210.

Meanwhile, in the exemplary embodiment of the present disclosure, an air guider 300 may be provided between the air conditioner 210 and the cooling device 230 for guiding the external air introduced from the outside thereof to the air conditioner 210 and the cooling device 230.

The air guider 300 may properly guide and distribute the external air introducing from the outside thereof to the air conditioning device 210 and the cooling device 230 while the vehicle is driving to smoothly introduce it.

Herein, as shown in FIGS. 7 and 8, a plurality of penetration holes 310 are formed in the air guider 300 at a position corresponding to the discharge holes 216.

The penetration holes 310 may be supplied the condensed water of the evaporator 214 discharged from the discharge holes 216 to the cooling device 230.

Accordingly, the cooling device 230 may more efficiently cool the working fluid circulated therein using the condensed water supplied to the surface of the cooling device 230 through the penetration holes 310 together with the outside air introducing from the outside.

Accordingly, the cooling efficiency and cooling performance of the cooling device 230 may be further improved through the above-described operation.

Therefore, according to the mounting structure of the thermal management module for the vehicle according to various exemplary embodiments of the present disclosure configured as described above, the thermal management module 200 may be stably mounted while minimizing the mounting space in front of the vehicle body in the Purpose Built Vehicle (PBV).

Furthermore, by applying the thermal management module in which the air conditioner and the cooling device are modularized, the layout may be simplified in the narrow vehicle front space, and mountability, assemblability, and maintainability may be improved.

Furthermore, according to an exemplary embodiment of the present disclosure, the cooling efficiency and cooling performance of the cooling device 230 may be improved by supplying the condensed water generated by the evaporator 214 provided inside the air conditioner 210 to the cooling device 230.

Furthermore, the present disclosure may maximize the internal space of the vehicle which may be applied for various purposes by mounting the thermal management module 200 to the vehicle body in the Purpose Built Vehicle (PBV).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A mounting structure of a thermal management module for a vehicle, the mounting structure comprising:
    a mounting carrier mounted at a front of a vehicle body and having a receiving space; and
    the thermal management module mounted in the receiving space;
    wherein the thermal management module includes:
        an air conditioner mounted in the receiving space and configured to adjust a temperature of a vehicle interior according to a cooling mode or a heating mode; and
        a cooling device mounted in the receiving space and configured to heat-exchange with a working fluid using an external air introduced from outside of the cooling device,
    wherein an air guider is provided between the air conditioner and the cooling device and configured for guiding an external air introduced from the outside of the air guider to the air conditioner and the cooling device,
    wherein an evaporator is provided inside the air conditioner,
    wherein at least one discharge hole is formed in the air conditioner toward the cooling device at a position corresponding to the evaporator,
    wherein at least one penetration hole is formed in the air guider at a position corresponding to the at least one discharge hole, and
    wherein the at least one penetration hole is configured to supply a condensed water of the evaporator discharged from the at least one discharge hole to the cooling device.

2. The mounting structure of claim 1, wherein the mounting carrier includes:
    a front frame positioned in a front based on a front and rear direction of the vehicle;
    side frames extending from first and second end portions of the front frame toward a rear of the vehicle body; and a rear frame connected to each of the side frames at a rear of the side frames.

3. The mounting structure of claim 2, wherein the rear frame is positioned above the front frame based on a height direction of the vehicle.

4. The mounting structure of claim 2, wherein the front frame, the side frames, and the rear frame are integrally formed.

5. The mounting structure of claim 2, wherein in the front frame, the side frames and the rear frame, a plurality of ribs is formed to crossed vertically, or horizontally, or obliquely based on a top-bottom direction of the mounting carrier.

6. The mounting structure of claim 1, wherein the air conditioner is provided at a top portion of the cooling device in the receiving space.

7. The mounting structure of claim 1, wherein the cooling device is at a slant provided at a predetermined angle so that a rear of the cooling device is positioned higher than a front of the cooling device based on a height direction of the vehicle.

8. The mounting structure of claim 1, wherein the cooling device is mounted on the mounting carrier through a mounting unit.

9. The mounting structure of claim 1, wherein a cooling fan is provided at a rear of the cooling device.

\* \* \* \* \*